(12) United States Patent
Roukema et al.

(10) Patent No.: US 11,541,728 B2
(45) Date of Patent: Jan. 3, 2023

(54) MOBILE ACCOMMODATION AS WELL AS A FRAMED WINDOW AND A FRAMEWORK THEREFOR

(71) Applicant: POLYPLASTIC GROUP B.V., Rotterdam (NL)

(72) Inventors: Joris Michiel Roukema, Bergschenhoek (NL); Jan Peter Veeneman, Bergschenhoek (NL)

(73) Assignee: POLYPLASTIC GROUP B.V., Rotterdam (NL)

( * ) Notice: Subject to any disclaimer, the term of this patent is extended or adjusted under 35 U.S.C. 154(b) by 351 days.

(21) Appl. No.: 16/763,186

(22) PCT Filed: Nov. 12, 2018

(86) PCT No.: PCT/NL2018/050754
§ 371 (c)(1),
(2) Date: May 11, 2020

(87) PCT Pub. No.: WO2019/093896
PCT Pub. Date: May 16, 2019

(65) Prior Publication Data
US 2020/0290435 A1    Sep. 17, 2020

(30) Foreign Application Priority Data

Nov. 10, 2017   (NL) .................................. 2019881

(51) Int. Cl.
*B60J 1/00*        (2006.01)
(52) U.S. Cl.
CPC ............... *B60J 1/007* (2013.01); *B60J 1/006* (2013.01)

(58) Field of Classification Search
CPC .................................. B60J 1/007; B60J 1/006
USPC ........................................................... 49/504
See application file for complete search history.

(56) References Cited

U.S. PATENT DOCUMENTS

| | | | |
|---|---|---|---|
| 6,286,891 B1 * | 9/2001 | Gage ......................... | B60J 1/06 52/204.51 |
| 2011/0192091 A1 * | 8/2011 | Smith ........................ | B60J 1/16 49/504 |

FOREIGN PATENT DOCUMENTS

| | | |
|---|---|---|
| DE | 8016888 | 12/1981 |
| DE | 4009348 A1 | 9/1991 |
| DE | 29703784 U1 | 5/1997 |
| DE | 19651618 A1 | 6/1998 |
| EP | 0867590 | 9/1998 |
| EP | 0867590 A1 * | 9/1998 |
| WO | WO2015186273 A1 | 11/2015 |

* cited by examiner

*Primary Examiner* — D Glenn Dayoan
*Assistant Examiner* — Dana D Ivey
(74) *Attorney, Agent, or Firm* — Perry + Currier Inc.

(57) ABSTRACT

A mobile accommodation, such as a caravan or camper, comprises a wall with a wall opening (5) in which a framed window (2,4) is arranged. The framed window comprises a casing frame (20) which drops with a flanged edge (25) over an, edge part of the wall (10) and which is fixed on an opposite side in the wall opening (5) by mounting clamps (40). These mounting clamps (40) further comprises a snap member (42) for a snapping engagement in a snap cavity (33) of a framework (30) arranged on an inner side.

17 Claims, 2 Drawing Sheets

MOBILE ACCOMMODATION AS WELL AS A FRAMED WINDOW AND A FRAMEWORK THEREFOR

CROSS REFERENCE TO RELATED APPLICATIONS

This application is a continuation under 35 U.S.C. § 371 of International Application No. PCT/NL20187/050754 filed on Nov. 12, 2018 which claims priority to Dutch Patent Application No. NL2019881 filed Nov. 10, 2017, which is hereby incorporated by reference herein in its entirety.

The present invention relates to a mobile accommodation, in particular a recreational vehicle such as a caravan or camper, comprising an accommodation enclosed by walls, wherein at least one of the walls is provided with a wall opening with a window, wherein the window is arranged in a surrounding casing frame and placed with interposing hereof in the wall and wherein on a side facing toward the accommodation a framework is arranged adjacently of the window and connected by a snap connection to the casing frame while enclosing an edge part of the wall of the accommodation adjacent to the wall opening.

This relates particularly to a mobile accommodation in the form of a caravan or camper, also referred to as a mobile home. The walls hereof are usually formed by sandwich panels of opposite hard shells with a foamed core. Wall openings are provided therein at a location where a window must eventually be present. This relates not only to transparent windows but for instance also to usually opaque luggage hatches, translucent and transparent skylights and the like. These can take an openable as well as fixed form.

It is a continuous challenge to limit the fitting time for such windows and to make assembly as simple as possible. The fitting of the windows is in the hands of the builder of the respective mobile accommodation, while the windows come from a selected supplier. In order to limit this fitting time and to simplify placing of the window, the window is advantageously pre-mounted in a casing frame by the supplier and, in the case of an openable window, already provided with all the necessary hanging and closing fittings such as opening arms and closures. Reference is usually made in that case to a framed window.

Provided it has been delivered in such a preformed state, the builder of the accommodation need only place the casing frame, with the pre-mounted window therein, into the wall opening and secure it therein. This therefore saves a considerable amount of construction time and complexity in the final assembly by the builder. Normally provided on an inner side of the accommodation is a framework which not only fulfils a decorative function but can also serve as a holder and/or mounting base for an optional window covering. A framed window is known for instance from an earlier European patent application of applicant.

The present invention has for its object, among others, to take a further step toward the quickest and simplest possible mounting of windows in the walls of a mobile accommodation.

In order to realize the stated object a mobile accommodation of the type described in the preamble has the feature according to the invention that the casing frame comprises a flanged edge at least substantially all around with which the casing frame lies on the edge part of the wall on a side remote from the accommodation, that the casing frame is provided along a periphery thereof with a number of fixation members which in the mounted state of the window engage on the edge part of the wall on a side facing toward the accommodation, and that the snap connection between the framework and the casing frame extends from mutually registering and co-acting snap means provided on both which are provided on one side on the framework and on the other on the fixation members.

The fixation members thus fulfil a dual function. On the one hand the framed window is fixed therewith in the wall opening, while on the other they also form a mounting base for the snap connection to the framework on the inner side of the wall opening in that a part of the snap means intended for this purpose extends according to the invention from these fixation members. No separate means or members need therefore be further arranged for the intended snap connection, so that the framework can be arranged immediately and directly after the casing frame has been fixed in the wall opening. The casing frame after all already comprises the fixation members for its own fixation. This also saves time for the builder of the accommodation, who need only adjust the fixation members from the first position to the second position, wherein they lie clampingly over the edge part. The edge part then lies enclosed clampingly between the flanged edge of the casing frame and the fixation members.

In a preferred embodiment the mobile accommodation according to the invention is characterized here in that the fixation members are manually adjustable between a first position, in which the fixation member is free of the edge part, and a second position in which the fixation member lies clampingly on the edge part. A particular embodiment of the mobile accommodation has in this respect the feature that the fixation members are rotatable within a half turn, in particular through about a quarter turn, about an axis directed substantially transversely of the wall from the first position to the second position. A half and quarter turn are respectively understood here to mean a rotation through about 180 degrees and 90 degrees. By simply being turned through less than half, and in particular through only a quarter, of a complete rotation the fixation members can thus be moved from the first to the second position so as to be thus clamped behind the edge part.

A particular embodiment of the mobile accommodation has for this purpose the feature that the fixation members comprise in each case a bush which is rotatable over a shaft, which shaft is connected to the casing frame, and that extending laterally from the bush is a wing which in the first position lies outside the edge part and in the second position hooks behind the edge part. With a view to a perceptible and failsafe fixation, a preferred embodiment of the mobile accommodation is characterized here in that the fixation members comprise a stop and come up against the stop in the second position. During mounting of the framed window the fixation members are simply adjusted here as far as their stop so that the builder feels and knows that the fixation member has wholly taken up its locking position.

The fixation members can be embodied with a fixed length which will then be adapted to a wall thickness of the wall in which the window will eventually be placed. However, with a view to a greater degree of flexibility and uniformity in the production of the framed window, a further particular embodiment of the mobile accommodation according to the invention has the feature that the fixation members are length-adjustable transversely of the wall. The fixation members can in this case be adjusted in the length and set to the correct wall thickness during fitting of the window so that the edge part will be engaged clampingly thereby.

In a further particular embodiment the mobile accommodation according to the invention is characterized in that the fixation members comprise on a free distal end remote from the casing frame a head which snaps into a snap cavity, which snap cavity extends from the framework. The free head of the fixation member snaps here into the snap cavity extending from the framework so as to thus bring about a mutual connection between the framework and the casing frame while enclosing the edge part of the wall of the accommodation.

Although the invention is also suitable for fixed, i.e. non-openable, windows and panels, the invention particularly provides a great advantage for final assembly of openable windows and panels. With this in mind, a further particular embodiment of the mobile accommodation according to the invention has the feature that the window is openable, and via at least one opening member is hung in openable manner in the casing frame, and that the window and the casing frame are both provided with closure means with which the window is closable. At least substantially all hanging and closing fittings of the openable window are thus pre-mounted in correct manner and position in the casing frame, which will of course save much time during fitting of the window in the wall opening of the accommodation.

The invention is highly suitable for windows which will often take up a significant part of a surface area of the wall. With the thermal insulation value of such windows in mind, a further particular embodiment of the mobile accommodation according to the invention has the feature that the window is double-walled and is constructed from a first sheet body and a second sheet body connected thereto which in a central part enclose a cavity therebetween but on their periphery make mutual contact with edge parts along which the two sheet bodies are attached to each other, and more particularly that the sheet bodies are formed from the same translucent plastic, in particular a transparent plastic from a group comprising polymethyl methacrylate (PMMA), polyethylene terephthalate glycol (PETG), polycarbonate (PC) and polyester.

With a view to an effective sealing of the window a further preferred embodiment of the mobile accommodation according to the invention has the feature that the flanged edge is attached via an adhesive, in particular a mastic or glue, to the edge part. The adhesive applied here not only fulfils the function of an effective moisture barrier but moreover provides for a structural strength between the stiff casing frame and the edge part of the wall, whereby the wall as a whole gains in strength.

From an aesthetic viewpoint, as well as from aerodynamic perspective, the window preferably lies as flush as possible in the wall of the accommodation. In order to fulfil this requirement a further particular embodiment of the mobile accommodation according to the invention has the feature that a visible side of the flanged edge is plate-like and lies flush with the edge part so that a visible side thereof lies at least substantially in a common plane with an outer side of the window. The casing frame thus protrudes with the plate-like flanged edge with only a (minimal) material thickness of the flanged edge above the wall so that the visible side of the flanged edge, the window and the wall lie at least substantially in one line relative to each other. Not only is this aesthetically exceptionally attractive, it also limits disruptive turbulence when the accommodation is in transit.

A further continuing endeavour in the manufacture of framed windows is that for low production costs while nevertheless while preserving freedom of design, particularly in the case of series production. With this in mind a further particular embodiment of the mobile accommodation according to the invention has the feature that the flanged edge extends from a construction part which is formed directly in one whole and particularly comprises an injection-moulded part of plastic, in particular a plastic taken from a group comprising polyethylene (PE), polypropylene (PP) and acrylonitrile butadiene styrene (ABS). Other than casing frames for framed windows known up until now which have been assembled from one or more extrusion profiles of plastic or aluminium, a casing frame is opted for here which is formed directly as one whole, particularly by injection moulding of a suitable plastic.

The invention also relates to a framed window as applied in the above described mobile accommodation according to the invention, and to a framework for application therewith. The invention will be further elucidated hereinbelow with reference to an exemplary embodiment and an accompanying drawing. In the drawing.

Figure 1:
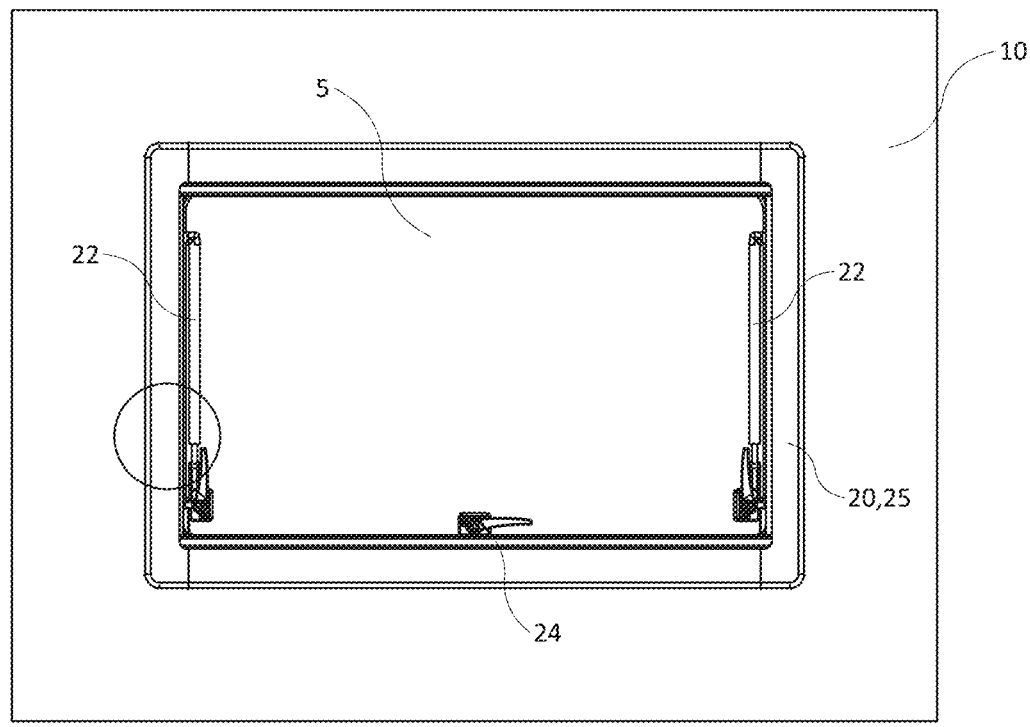
FIG. 1 shows a view of an exemplary embodiment of a mobile accommodation according to the invention.
Figure 2:
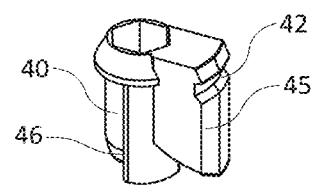
FIG. 2 shows in perspective a mounting clamp as applied in the mobile accommodation of FIG. 1.
Figure 3A:
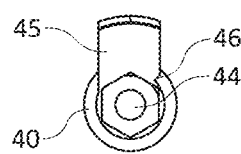
Figure 4:
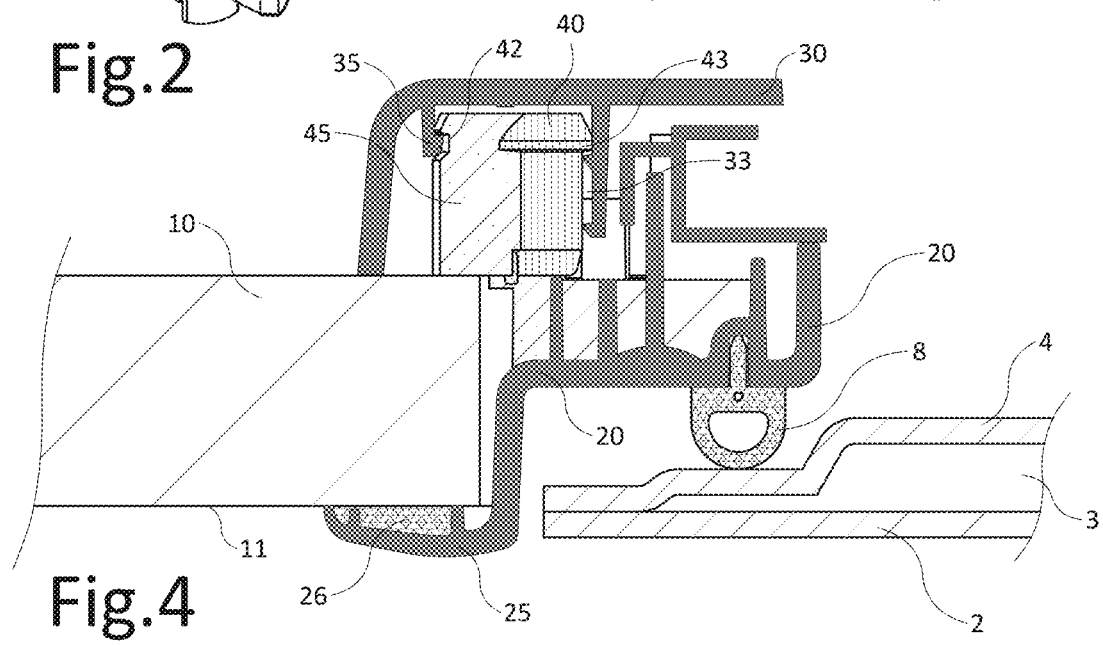
Figure 5:
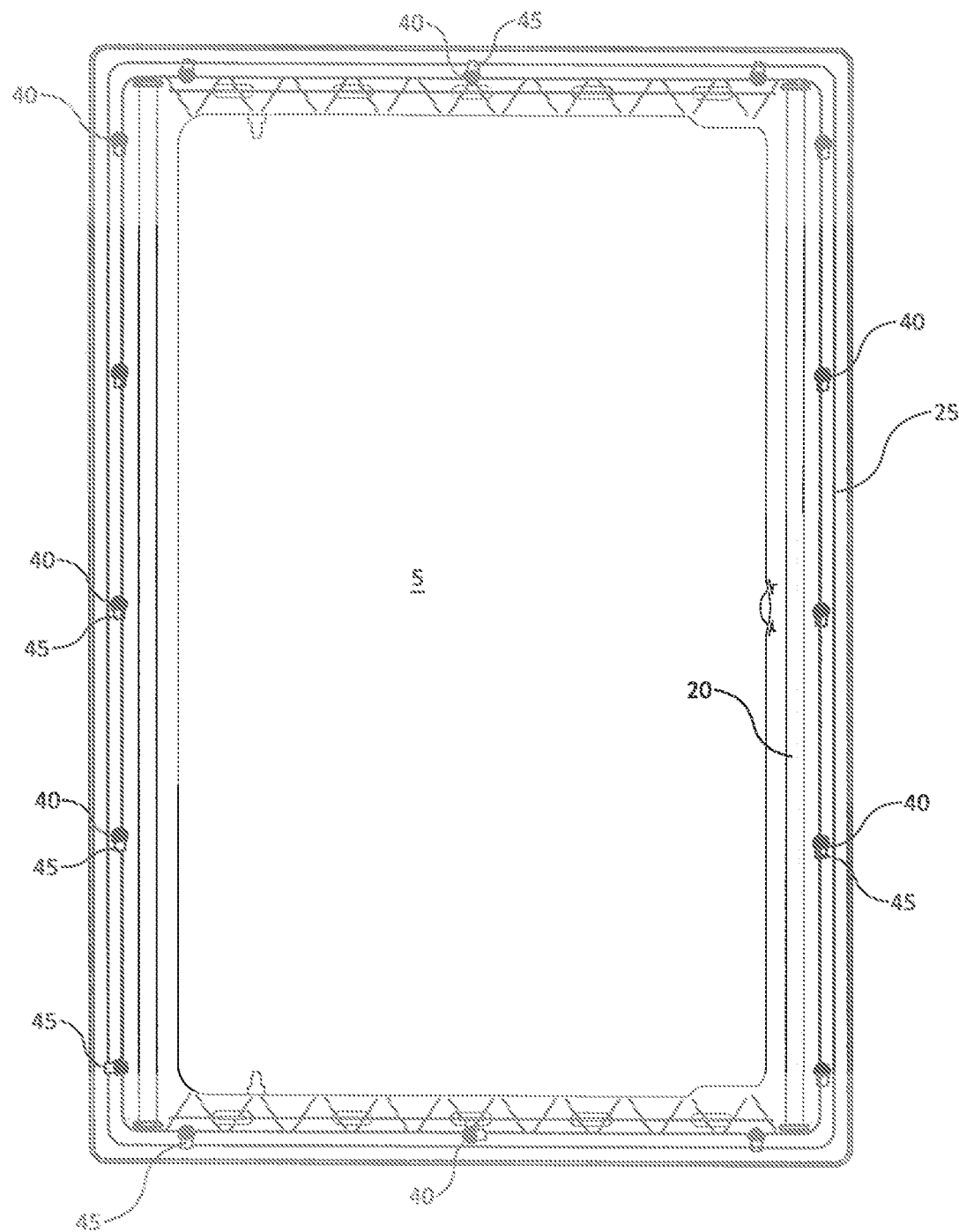

FIGS. 3A,B are top views of the mounting clamp of FIG. 2 in respectively a first and a second position;

FIG. 4 shows a cross-section of a framed window at the position of circle IV in the accommodation of FIG. 1; and FIG. 5 is a rear view of the framed window of FIG. 4.

It is otherwise noted here that the figures are purely schematic and not always drawn to (the same) scale. Some dimensions in particular may be exaggerated to greater or lesser extent for the sake of clarity. Corresponding parts are designated in the figures with the same reference numeral.

Shown in FIG. 1 is a part of a wall 10 of a mobile accommodation such as a caravan or camper. The wall typically comprises a sandwich construction of a hard inner shell and outer shell of for instance aluminium or a suitable plastic with a thickness of several millimetres, wherein the interior is optionally covered with a wood design or other decorative wall finish. For an effective thermal insulation both shells are separated from each other by a foamed core several centimetres thick, of for instance polyurethane or polystyrene. The further details of such a wall construction in a mobile accommodation such as a camper, caravan, yacht or the like is assumed sufficiently known to a person with ordinary skill in the art.

Recessed into wall 10 is a wall opening 5 at the location of which a window is arranged in this example. This is an openable window which is provided for this purpose with opening arms 22 and a closable latch 24. This window is pre-mounted together with these hanging and closing fittings in a form-retaining, relatively stiff casing frame 20,25 arranged all round in opening 5. Such a window is for this reason normally referred to as a framed window. The shown part of casing frame 20 in which the window will be hung and with which the whole lies within wall opening 5 is in this example formed directly and in one whole as injection-moulded part from a suitable plastic such as polyethylene, polystyrene, polypropylene or ABS. Hereby possible is an exceptionally light but sufficiently stiff construction with a high measure of freedom of shape and design.

The construction of casing frame 20,25 is shown in further detail in FIG. 4 in a cross-section at the position of circle IV in FIG. 1. The casing frame comprises a substantially flat flanged edge 25 with which it lies on an outer side 11 of wall 10. With a view to an effective moisture-tightness the casing frame with the flanged edge is connected via a suitable adhesive 26, such as a curing mastic or glue, to the edge part of wall 10 shown in FIG. 4. This restores the structural strength of wall 10 which has otherwise been partially lost through the creation of wall opening 5. Inside this opening the casing frame comprises a base part 20 which extends all around in opening 5 and provides a basis for the hanging and closing fittings 22,24 and for hinged suspension of the window.

The window is formed in this example from a set of sheet bodies 2,4 of a transparent plastic, here PMMA, wherein the outward facing pane 2 is wholly flat and the inner pane 4 is dish-shaped. The two panes 2,4 hereby enclose at a central part an insulating cavity 3 relative to each other. The two panes 2,4 make contact with each other along their whole periphery with respective flat edge parts which are glued to each other to form an integral and stiff assembly. A sealing profile 8 of a suitable elastomer is arranged between window 2,4 and casing frame 20 for a watertight closure. Casing frame 20 comprises a cavity for attachment of this seal.

In order to place the framed window the window is placed from outside in wall opening 5, wherein flanged edge 25 will drop over the edge part of wall 10 adjacent to opening 5. Provided beforehand therebetween is the adhesive bead 26 which will already ensure a certain adhesion to wall 10, whereby the window remains in position in opening 5. The casing frame comprises all around on the periphery fixation means in the form of a series of mounting clamps 40 of the type shown in FIG. 2, see also FIG. 5.

Figure 3B:
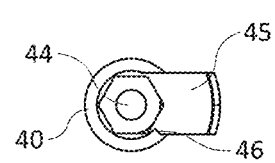

These mounting clamps are connected to the casing frame and are rotatable about their shaft from the first position shown in FIG. 3A, in which they lie clear of wall 10, to the position shown in FIG. 3B in which they have been rotated through about 90 degrees and a wing 45 extending therefrom will lie clampingly against an inner side of wall 10. This provides for a permanent fixation of casing frame 20 in wall opening 5, wherein the adhesive bead 26 has the opportunity to dry and cure further. The mounting clamps can be provided here with a stop 46 which prevents a rotation beyond 90 degrees so that a correct engagement in this fixing second position is both visible and perceptible.

The whole assembly is finally finished on an inner side with a framework 30 which, in addition to fulfilling a decorative function, also serves as holder for a window covering such as a mesh screen and/or blackout blind in the form of a roller blind. For framework 30 use is also made in this example of an injection-moulded part which is formed directly as one whole in a mould with a snap cavity 33 for a snap connection to casing frame 20. This snap cavity 33 extends all around and is therefore everywhere present around the periphery of the framework.

Situated in this snap cavity 33 is a set of inward projecting edges 35 which serve as snap means for the purpose of engaging with complementary snap means extending from mounting clamps 40. On their free outer end mounting clamps 40 comprise for this purpose in their periphery a groove 42 in wing 45 and an edge 43 on shaft 40 in which edges 35 will snap when framework 30 is pressed correctly with snap cavity 33 onto the casing frame, i.e. such that the cavity registers with mounting clamps 40 and the head of each of the mounting clamps is received in cavity 33. Final assembly of the framed window according to the invention is thus possible in a very short time, wherein the mounting clamps fulfil a dual function of a more permanent fixation of the framed window in wall opening 5 and a fast-fitting basis for a snap connection to framework 30.

Although the invention has been further elucidated above with reference to only a single exemplary embodiment, it will be apparent that the invention is by no means limited thereto. On the contrary, many variations and embodiments are still possible within the scope of the invention for a person with ordinary skill in the art.

Use is thus made in the exemplary embodiment of mounting clamps which are connected for rotation about their longitudinal axis to the casing frame and are thus adjustable for the purpose of fixing the casing frame. Use can also be made instead of mounting clamps which are linearly adjustable, for instance in that they can slide from a first to a second position, in which second position they extend over the edge part of wall 10.

Although use is also made of an openable window in the example, the invention can also be advantageously applied for a fixed window or panel, such as for instance a skylight which serves only for entry of daylight. Nor is the invention limited to transparent windows, but can likewise be utilized for opaque luggage hatches and semi-transparent, translucent windows. The invention generally provides a simple and substantially tool-free manner with which a wall opening provided for the purpose in the wall of a mobile accommodation can be provided within a very short time with a window.

The invention claimed is:

1. A mobile, accommodation, in particular a recreational vehicle such as a caravan or camper, comprising an accommodation enclosed by walls, wherein at least one of the walls is provided with a wall opening with a window, wherein the window is arranged in a surrounding casing frame and placed with interposing hereof in the wall, wherein on a side facing toward the accommodation a framework is arranged adjacently of the wall opening and connected by a snap connection to the casing frame while enclosing an edge part of the wall of the accommodation adjacent to the wall opening, wherein the casing frame comprises a flanged edge at least substantially all around with which the casing frame lies on the edge part of the wall on a side remote from the accommodation, wherein the casing frame is provided along a periphery thereof with a number of fixation members which in the mounted state of the window engage on the edge part of the wall on a side facing toward the accommodation, and wherein the snap connection between the framework and the casing frame extends from mutually registering and co-acting snap means provided on both which are provided on one side on the framework and on the other on the fixation members.

2. The mobile accommodation as claimed in claim 1, wherein the fixation members are manually adjustable between a first position, in which the fixation member is free of the edge part, and a second position in which the fixation member lies clampingly on the edge part.

3. The mobile accommodation as claimed in claim 2, wherein the fixation members comprise a stop and come up against the stop in the second position.

4. The mobile accommodation as claimed in claim 1, wherein the fixation members are length-adjustable transversely of the wall.

5. The mobile accommodation as claimed in claim 1, wherein the fixation members comprise on a free distal end remote from the casing frame a head which snaps into a snap cavity, which snap cavity extends from the framework.

6. The mobile accommodation as claimed in claim 1, wherein the window is openable, and via at least one opening member is hung in openable manner in the casing frame, and wherein the window and the casing frame are both provided with closure means with which the window is closable.

7. The mobile accommodation as claimed in claim 1, wherein the window is double-walled and is constructed from a first sheet body and a second sheet body connected thereto which in a central part enclose a cavity therebetween but on their periphery make mutual contact with edge parts along which the two sheet bodies are attached to each other.

8. The mobile accommodation as claimed in claim 7, wherein the sheet bodies are formed from the same translucent plastic, in particular a transparent plastic from a group comprising polymethyl methacrylate (PMMA), polyethylene terephthalate glycol (PETG), polycarbonate (PC) and polyester.

9. The mobile accommodation as claimed in claim 1, wherein the flanged edge is attached via an adhesive, in particular a mastic or glue, to the edge part.

10. The mobile accommodation as claimed in claim 1, wherein a visible side of the flanged edge is plate-like and lies flush with the edge part so that a visible side thereof lies at least substantially in a common plane with an outer side of the window.

11. The mobile accommodation as claimed in claim 10, wherein the flanged edge extends from a construction part which is formed directly in one whole and particularly comprises an injection-moulded part of plastic, in particular a plastic taken from a group comprising polyethylene (PE), polypropylene (PP) and acrylonitrile butadiene styrene (ABS).

12. Framed window comprising a window mounted in a casing frame as applied in the mobile accommodation of claim 1.

13. Framework for application with the framed window as claimed in claim 12.

14. A mobile accommodation, in particular a recreational vehicle such as a caravan or camper, comprising an accommodation enclosed by walls, wherein at least one of the walls is provided with a wall opening with a window, wherein the window is arranged in a surrounding casing frame and placed with interposing hereof in the wall, and wherein on a side facing toward the accommodation a framework is arranged adjacently of the wall opening and connected by a snap connection to the casing frame while enclosing an edge part of the wall of the accommodation adjacent to the wall opening, wherein the casing frame comprises a flanged edge at least substantially all around with which the casing frame lies on the edge part of the wall on a side remote from the accommodation, wherein the casing frame is provided along a periphery thereof with a number of fixation members which in the mounted state of the window engage on the edge part of the wall on a side facing toward the accommodation, and wherein the snap connection between the framework and the casing frame extends from mutually registering and co-acting snap means provided on both which are provided on one side on the framework and on the other on the fixation members, wherein the fixation members are manually adjustable between a first position, in which the fixation member is free of the edge part, and a second position in which the fixation member lies clampingly on the edge part, and wherein the fixation members are rotatable within a half turn, and in particular through about a quarter turn, about an axis directed substantially transversely of the wall from the first position to the second position.

15. The mobile accommodation as claimed in claim 14, wherein the fixation members comprise in each case a bush which is rotatable over a shaft, which shaft is connected to the casing frame, and wherein extending laterally from the bush is a wing which in the first position lies outside the edge part and in the second position hooks behind the edge part.

16. The mobile accommodation as claimed in claim 15, wherein the fixation members comprise a stop and come up against the stop in the second position.

17. The mobile accommodation as claimed in claim 14, wherein the fixation members comprise a stop and come up against the stop in the second position.

\* \* \* \* \*